United States Patent

[11] 3,622,624

| [72] | Inventors | Yael Arad<br>Tel-Aviv;<br>Moshe Levy, Rehovot; David Vofsi,<br>Rehovot, all of Israel |
|---|---|---|
| [21] | Appl. No. | 745,712 |
| [22] | Filed | July 18, 1968 |
| [45] | Patented | Nov. 23, 1971 |
| [73] | Assignee | UCB (Union Chimique-Chemische<br>Bedrijven)<br>Drogenbos, Belgium |
| [32] | Priority | July 21, 1967 |
| [33] | | Israel |
| [31] | | 28373 |

[54] PROCESS FOR THE PRODUCTION OF ADIPIC ACID
4 Claims, No Drawings

[52] U.S. Cl. .................................................... 260/537 R,
260/540

[51] Int. Cl. .................................................... C07c 51/00,
C07c 55/14
[50] Field of Search .......................................... 260/537,
540

[56] References Cited
UNITED STATES PATENTS

| 3,322,819 | 5/1967 | Schreyer ........................ | 260/537 |
| 3,484,475 | 12/1969 | Cornforth et al. ............ | 260/537 |

*Primary Examiner*—Lorraine A. Weinberger
*Assistant Examiner*—Vivian Garner
*Attorney*—McGlew and Toren

ABSTRACT: Adipic acid can be produced in a good yield and with only a small production of propionic acid by carrying out the alkali metal amalgam hydrodimerization of acrylic acid in dimethyl sulfoxide preferably admixed with water.

PROCESS FOR THE PRODUCTION OF ADIPIC ACID

This invention relates to the hydrodimerization of acrylic acid to form adipic acid.

The hydrodimerization of acrylic acid derivatives, and more specifically acrylonitrile, methacrylonitrile, esters of acrylic acid and acrylamide can be carried out by the action of an alkali metal amalgam on the acrylic acid derivatives in a solvent medium. A mixture of water and dimethyl sulfoxide (DMSO) has been found to be an especially advantageous solvent medium. The pH of the reaction medium is as a rule maintained neutral in the course of the reaction by addition of acid. The process can also be performed without pH control; in this case the reaction mixture becomes strongly alkaline owing to the formation of alkali hydroxide during the reaction. As a rule minor amounts of byproducts are formed, such as propionic acid derivatives. When the pH of the reaction medium is too low the percentage of the byproducts rises appreciably, e.g. that of propionitrile at the expense of adiponitrile.

Free acrylic acid has not yet been successfully subjected to hydrodimerization by reaction with alkali metal amalgam. In analogy with the known facts aforesaid it was to be assumed that the reaction of acrylic acid with alkali amalgam could produce propionic acid. This is really so when the reaction is carried out in an ether medium such as tetrahydrofuran or diglyme.

According to the present invention it has been found that adipic acid can be produced in a good yield and with only a minor byproduction of propionic acid by the alkali metal amalgam hydrodimerization of acrylic acid in a solvent medium containing DMSO, preferably admixed with water, e.g. in an amount of 5-20 percent by weight of the DMSO.

The acrylic acid is preferably used in a concentration between 1 and 20 percent, desirably 2-5 percent, by weight of the reaction liquid (exclusive of the amalgam).

The reaction mixture is preferably so composed that it remains acidic in the course of the reaction, except, perhaps, at the interphase between the amalgam and the reaction liquid proper. For this purpose the acrylic acid serving as starting material may be used in a suitable excess over the amount corresponding to the amount of alkali metal contained in the amalgam as a reactant. Or else, another nondimerizable acid may be added to the reaction liquid, e.g. hydrochloric, sulfuric, p-toluene-sulfonic or acetic acid, before the reaction is started. Hydrochloric acid has been found to be preferable. The amount of added acid may be equivalent to or preferably even higher than the amount of acrylic acid.

The amalgam used may be, for example, sodium, potassium or lithium amalgam, and the concentration of the alkali metal in the amalgam may be from 0.05 to 0.5 percent by weight.

In some cases it was found that inert solvents may advantageously be added to the DMSO, e.g. tetrahydrofuran, diglyme or dioxane. This may result in higher propionic acid yields but there may be some operational advantages that may make these additions profitable.

The reaction temperature should be maintained low, e.g. between 0° and 30° C., preferably at about 10° C.

The invention is illustrated by the following examples to which it is not limited:

EXAMPLE 1

Ten g. of acrylic acid, (containing 0.1 percent of p-methoxy phenol as a commercial polymerization inhibitor which need not be removed from the acrylic acid when this is used as a starting material in the process of this invention) and 25 g. water were dissolved in 200 cc. of DMSO.

The solution was introduced into a flask containing 200 cc. of sodium amalgam (sodium content 0.3 percent by weight). The mixture was stirred for 15 minutes and the temperature was maintained at 10° C. by cooling with ice water. After the reaction was completed the amalgam was separated and the solution was acidified with HCl. The NaCl formed was filtered off and the filtrate was subjected to fractional distillation at reduced pressure.

The first fraction was a mixture of acrylic and propionic acids, the second fraction was DMSO. The solid remaining as a residue was recrystallized from aqueous ethyl alcohol.

An aliquot of the filtrate obtained before distillation, was boiled for 5 minutes with a methanolic solution of $BF_3$. The resulting methyl esters were extracted with ether and injected into a gas chromatograph with a 5 meter long polyester column. The results of the chromatographic analysis were extrapolated for the entire amount of the product of the reaction and showed that the product contained 3.3 g. of acrylic acid, 1.6 g. of propionic acid and 4.1 g. of adipic acid. This amounts to an adipic acid yield of 61 percent, based on the consumed acrylic acid, and a propionic acid yield of 24 percent.

EXAMPLE 2

Ten g. of acrylic acid and 30 cc. of concentrated hydrochloric acid were dissolved in 100 cc. of DMSO. The solution was added dropwise to a mixture of 100 cc. of DMSO and 200 cc. of sodium amalgam (sodium content 0.3 percent by weight) in the course of 15 minutes while continuously stirring the mixture and maintaining the temperature at 10° C. The reaction products were treated as described in example 1. The products consisted of 7 g. of adipic acid and 2 g. of propionic acid, amounting to yields of 70 percent and 20 percent respectively.

We claim:

1. A process for the production of adipic acid by hydrodimerization of acrylic acid which comprises contacting said acrylic acid with an alkali metal amalgam in a medium comprising dimethyl sulfoxide and water and/or an acid selected from the group consisting of hydrochloric acid, sulfuric acid, p-toluene-sulfonic acid and acetic acid, and at a temperature between 0° and 30° C., the concentration of said acrylic acid in said medium being between 1 and 20 percent by weight.

2. Process as claimed in claim 1, in which the hydrodimerization is carried out at about 10° C.

3. Process as claimed in claim 1, in which the medium contains 5 to 20 percent water by weight of the dimethyl sulfoxide.

4. Process as claimed in claim 1, in which the concentration of acrylic acid in the reaction medium, exclusive of the amalgam, is between 2 and 5 percent by weight.

* * * * *